United States Patent
Domenicucci et al.

(10) Patent No.: US 9,221,618 B2
(45) Date of Patent: Dec. 29, 2015

(54) OVEN CHAIN MEASUREMENT SYSTEM

(71) Applicants: Philip J. Domenicucci, Rockaway, NJ (US); Jean-Sebastien Labrie, Sherbrooke (CA); Alain Lemieux, Sherbrooke (CA)

(72) Inventors: Philip J. Domenicucci, Rockaway, NJ (US); Jean-Sebastien Labrie, Sherbrooke (CA); Alain Lemieux, Sherbrooke (CA)

(73) Assignee: AMF Automation Technologies, LLC, Richmond, VA (US)

( * ) Notice: Subject to any disclaimer, the term of this patent is extended or adjusted under 35 U.S.C. 154(b) by 0 days.

(21) Appl. No.: 14/072,026

(22) Filed: Nov. 5, 2013

(65) Prior Publication Data

US 2014/0124336 A1 May 8, 2014

Related U.S. Application Data

(60) Provisional application No. 61/723,074, filed on Nov. 6, 2012.

(51) Int. Cl.
| | |
|---|---|
| *B65G 43/00* | (2006.01) |
| *B65G 43/02* | (2006.01) |
| *A21B 3/00* | (2006.01) |
| *B65G 23/44* | (2006.01) |

(52) U.S. Cl.
CPC . *B65G 43/02* (2013.01); *A21B 3/00* (2013.01); *B65G 23/44* (2013.01)

(58) Field of Classification Search
USPC .................................................. 198/810.02
See application file for complete search history.

(56) References Cited

U.S. PATENT DOCUMENTS

| | | | |
|---|---|---|---|
| 3,308,768 A | | 3/1967 | Orwin |
| 3,662,873 A | | 5/1972 | Ross |
| 3,963,115 A | * | 6/1976 | Teske et al. ................... 198/718 |
| 4,245,739 A | * | 1/1981 | Hartley et al. ........... 198/810.02 |
| 4,294,345 A | | 10/1981 | Stauber et al. |
| 4,422,544 A | | 12/1983 | Alldredge |
| 4,657,131 A | * | 4/1987 | Brychta et al. ........... 198/810.04 |
| 4,793,473 A | | 12/1988 | Gilgore et al. |
| 4,860,634 A | * | 8/1989 | Hein ............................ 91/363 R |
| 5,147,033 A | | 9/1992 | Kasik |
| 5,186,280 A | * | 2/1993 | Mattcheck ................... 184/15.3 |
| 5,579,897 A | | 12/1996 | Kasik |
| 6,257,397 B1 | | 7/2001 | Kilby et al. |
| 6,591,968 B2 | | 7/2003 | Snell et al. |
| 6,766,898 B2 | | 7/2004 | Lessard et al. |
| 6,968,943 B2 | | 11/2005 | Kilby et al. |
| 7,086,525 B2 | | 8/2006 | Kilby et al. |
| 7,140,486 B2 | * | 11/2006 | Kim ........................ 198/810.03 |
| 7,540,374 B2 | * | 6/2009 | Rathbun et al. .......... 198/810.04 |
| 8,151,977 B2 | | 4/2012 | Domenicucci et al. |
| 2004/0226805 A1 | * | 11/2004 | Lodge ...................... 198/810.02 |

* cited by examiner

*Primary Examiner* — William R Harp
(74) *Attorney, Agent, or Firm* — Thomas/Horstemeyer, LLP

(57) ABSTRACT

A chain tensioning sprocket is moveable with a predetermined force into a U-shaped path of a chain to apply continuous tensioning force to the chain. The change in length of the chain is measured by detecting the movement of the chain tensioning sprocket into the U-shaped path of the chain, and measurement of movement of the chain tensioning sprocket indicates a change in the length of the whole chain, which, in turn, indicates the wear on the parts of the chain and the expected operative life of the chain.

7 Claims, 5 Drawing Sheets

OVEN CHAIN MEASUREMENT SYSTEM

CROSS REFERENCE TO RELATED APPLICATION

This application claims priority with respect to provisional patent application Ser. No. 61/723,074, filed in the U.S. Patent and Trademark Office on Nov. 6, 2012, entitled Oven Chain Measurement System.

FIELD OF THE INVENTION

This disclosure concerns a process of managing the maintenance of industrial ovens, such as bakery ovens, including measuring the length of the conveyor chain to determine the expected life of the conveyor chain.

BACKGROUND OF THE INVENTION

Most industrial bakeries use tunnel ovens, traveling tray ovens, or other conveyorized ovens, all either direct or indirect heated for baking dough into bread. The conveying devices in all of these open ended ovens for advancing the bread products through the oven usually are some type of heavy duty continuous roller chain or mesh belting. These chains carry the pans or other carriers that support the baker's dough through the high temperature of the oven that bakes the dough. Ovens may have two or three parallel roller chains, or mesh belting, used for moving pans that carry the work products through the ovens. The oven conveyor chains are exposed to extremes of temperature from room temperature to in excess of 600° F. The ovens may have from a few hundred feet of chain length to more than a thousand feet of chain length that transport the pans that carry the work products through the oven.

Oven chains typically are roller chains that resemble a bicycle chain, in that the oven chains include a series of chain links that each includes a pair of parallel elongated side plates held to each other at their opposite ends by axles, with rollers mounted on the axles. The teeth of driving sprockets fit into the spaces defined by the rollers and the side plates, and the rotation of the sprockets drive and guide the chain links, causing the chain to move along its length. The teeth of the sprockets apply forces to the chain links and the chain links deteriorate over time.

Examples of some prior art oven chains are illustrated and described in U.S. Pat. Nos. 4,294,345; 5,147,033; and 7,086,525.

Oven chains usually have a life of five to ten years. In order to maintain the life of oven chains, the oven chains must be lubricated frequently, sometimes several times per day, usually with expensive high temperature resistant lubricant.

Oven roller chains are very large, heavy and expensive. Pans, trays, plates, mesh belts and grids, herein after referred to as "pans", are each mounted to a link of the chain and add to the cost and weight of the chain. When the large and heavy oven chains begin to wear out, the maintenance people cannot expect to just replace a single worn link in a chain since it is likely that several links have become worn and the pitches of the links have changed.

The main deterioration of a roller chain is on the rollers and roller axles of the chain links that directly receive the force applied by the sprockets that guide and urge the chain through its oven. The deterioration of the rollers and roller axles of a chain changes the length or "pitch" of the chain link. The changes of the lengths of the links of a roller chain tend to cause the overall length of the roller chain to increase. The increase of the length of a roller chain is an indication of wear of the parts of the chain. When the chain deteriorates it loses some of its strength and might break.

The replacement of oven chains usually requires several days to a week of oven downtime. Therefore, maintenance of oven chains is one of the highest priorities of a bakery maintenance department, and it is important to inspect the chain to estimate the remaining life of the chain.

When chains are to be inspected, usually the maintenance department of a bakery will stop the movements of a chain, allow the chain to cool, and remove a link of the chain and inspect it to view the wear on the link. Typically the maintenance personnel will measure the lengths of sections of chain links that is a multiple of the chain pitch. The chain must be tensioned for the inspection and multiple pitches are measured and compared to the desired lengths of multiple pitches. If the length of the chain has increased from the previous measurements, the maintenance personnel will estimate the rate of deterioration and estimate the remaining life of the oven chain. This is not a highly reliable or accurate method, but it is a process for determining wear on the chain links. This procedure usually is done in a confined space of the oven and is difficult to perform and is subject to human error. The measurements of the chain should be performed at the same temperature in order to avoid inaccurate measurements due to expansion or contraction of the chain due to different chain temperatures. The most notable change in a chain would be to observe movements between adjacent links of the chain.

For almost one hundred years calculating wear on oven chains has been a problem. Up until now there has been no expedient way to accurately and reliably measure and track chain wear in a bakery oven. As a result, oven chains usually are replaced long after they should have been, leaving the bakery a victim of reliability.

Accordingly, it would be desirable to monitor and measure the chains of high temperature ovens, such as bakers' ovens, without having to remove the chains from their operating conditions and while the chains are at any temperature, including the high operating temperature at which the oven usually operates, and to calculate the wear experienced by the chain and to determine the remaining useful life of the chain.

SUMMARY OF THE INVENTION

Briefly described, this disclosure relates to a chain management system for a continuous conveyor chain, such as a roller chain, that moves continuously to carry work products through a processing path, such as bread through an open ended hot baking oven.

The process and apparatus described herein may be used for determining the wear of a continuous roller chain of the type that moves products such as uncooked bread products through a heated tunnel oven, or other paths of movement. This may be accomplished without having to remove the chain from the chain drive system and without having to cool the oven or remove the chain from the oven.

More particularly, the process may include the steps of detecting the deterioration of a continuous conveyor link chain extending through an open ended bakery oven, even as the chain moves along its length through the oven while the oven is in operation. Usually, the deterioration of the chain is due to wear of the links of the chain, and as the links of the chain deteriorate the length of the chain increases.

The chain measuring process may include applying constant predetermined tension to the chain at different times and measuring the increase in length of the chain. The measurements may be made as the chain moves through the heated oven. Usually, the chain may be measured at different time intervals as the chain moves along its length under constant tension through the hot open ended oven. The measurements at different time intervals are compared to determine the rate of increasing length of the chain, and therefore the rate of deterioration of the chain and the remaining life of the chain.

Constant and predetermined tension force may be applied to the moving chain during the measurements of the chain. The chain extends in a U-shaped path about a chain tensioning sprocket, and a tensioning force is applied by moving the chain tensioning sprocket into the U-shaped path of the chain. This tends to increase the depth of the U-shaped path as the length of the chain increases due to wear and other conditions of the chain. A detector, such as a resistance transducer and wire, ultrasonic distance sensor or linear position sensor, may be applied to the chain tensioning sprocket to determine the position of the sprocket. As the chain wears and increases in length, the chain tensioning sprocket moves toward the depth of the U-shaped path to maintain the constant tension in the chain. A measurement of the change of position of the guide sprocket or the depth of the U-shaped path indicates the increased length of the entire chain.

In order to avoid measuring the expansion of the conveyor chain due to changes of chain temperature, the chain should be measured at the same temperature for each measurement, or a calculation of the temperature expansion of the chain should be made. Therefore, the process of measuring the chain may include recording the temperature of the chain when the chain is being measured. With this information, an estimate is made concerning the remaining useful life of the measured chain.

Another feature of this disclosure is the chain management system may include a chain tensioning system to minimize the variable chain tension produced by prior art spring take ups. A typical spring take up that is applied to a chain tensioning sprocket will tend to expand or contract due to changes in temperature of the chain and due to the temperature of the spring. Typically, the oven is cooler and without any product loading when the roller chain is about to be lubricated. But as the chain cools the chain shrinks and applies more force against the coil spring, causing increased tension in the spring and in the roller chain. This is not optimal for applying good lubrication to the roller chain.

This disclosure includes a fluid actuated chain tensioning system that applies constant force to the chain tensioning sprocket during the normal operation of the baking oven. When the oven operation is terminated the fluid activated tensioning system may be deactivated to relieve the force applied to the chain tensioning sprocket. This allows the chain to relax for lubrication and inspection.

This disclosure includes a process for detecting the deterioration of a continuous conveyor link chain extending through a continuous path due to wear of the links of the chain, by moving the chain along its length through the continuous path, extending the chain about a rotary chain tensioning device, moving the rotary chain tensioning device to apply constant tension in the chain, repeatedly measuring the movement of the rotary chain tensioning device at different times when constant tension is applied to the chain by the rotary chain tensioning device and as the chain moves along its length, comparing the measurements of the movement of the rotary chain tensioning device, and determining the remaining operational life of the chain based on the distance of linear movement of the chain tensioning device at different times.

Other objects, features and advantages of this disclosure will become apparent upon reading the following specification and claims and reviewing the accompanying drawings.

DETAILED DESCRIPTION

Figure 1A:
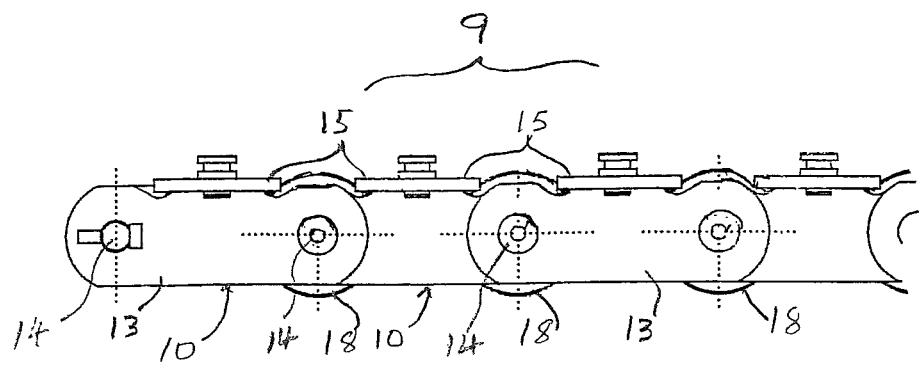
FIG. 1A is a side elevational view of a segment of an oven roller chain.
Figure 1B:
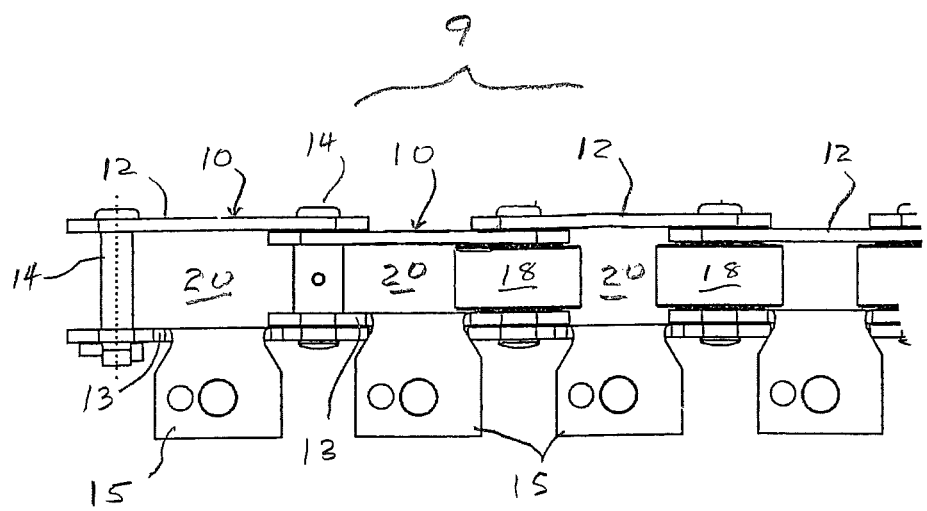
FIG. 1B is a top view of the segment of the roller chain of FIG. 1A, showing a connector pin and a bearing sleeve in the left two links, and the assembled rollers in the right two links.
Figure 2A:
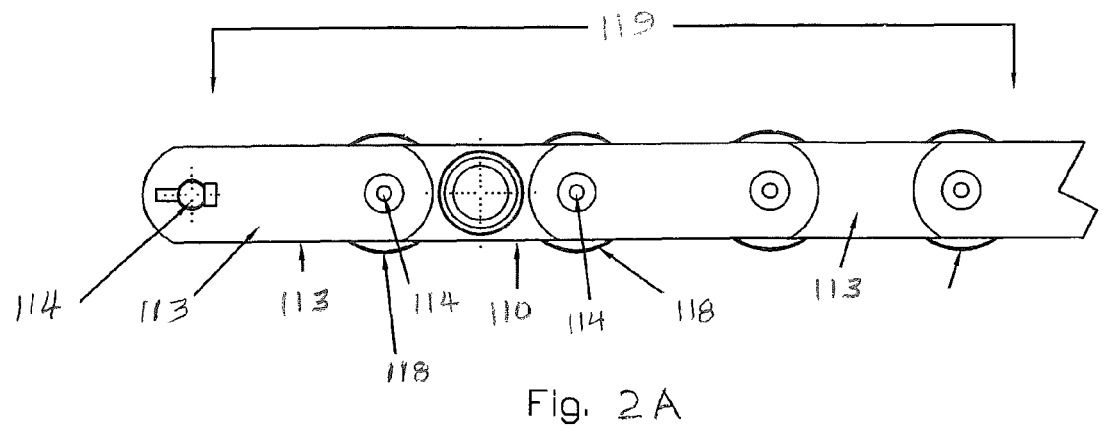
FIG. 2A is a side elevational view of a segment of another type of oven roller chain.
Figure 2B:
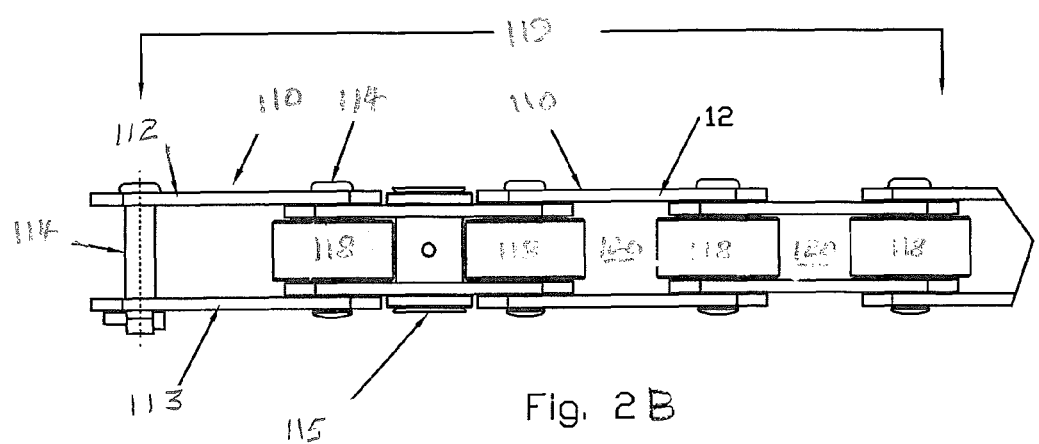
FIG. 2B is a top view of the segment of a roller chain of FIG. 2A.
Figure 3A:
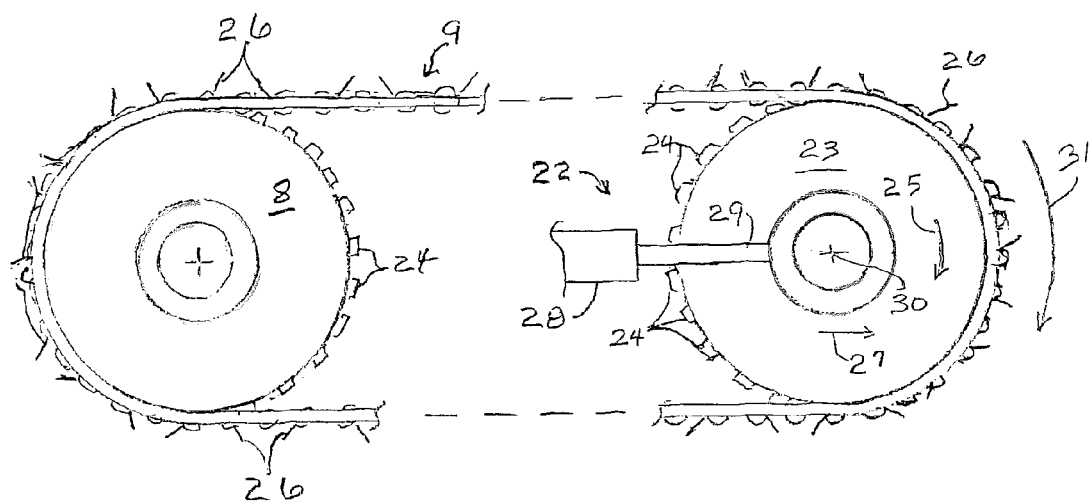
FIG. 3A is a side view of a chain tensioning sprocket, a driving sprocket, and a portion of the oven roller chain extending in a U-shape about the chain tensioning sprocket, with the cylinder and its piston that apply the force to the chain tensioning sprocket.

Referring in more detail to the drawings, in which like numerals indicate like parts throughout the several views, FIGS. 1A and 1B illustrate a segment of an endless roller chain 9 of the type that may be used in a tunnel of a baker's oven. FIGS. 2A and 2B illustrate a segment of another endless roller chain 119 also of the type that may be used in the same environment. Other types of chains may be used. As shown in FIG. 3A, the roller chain, such as chain 9, extends about a driving sprocket 8 and about a tensioning sprocket 23 and about other sprockets (not shown) that support and guide the chain.

As shown in FIGS. 1A and 1B an embodiment of a roller chain 9 has links 10 and each link may include a pair of parallel side plates 12, 13 that have end portions that overlap the side plates of the next adjacent chain links, and connector pins 14 that are mounted through the overlapping ends of the pairs of side plates. Rollers 18 are mounted on the connector pins 14 between the parallel side plates 12 and 13. Spaces 20 are located between and on opposite sides of each roller 18, between the side plates 12 and 13.

The teeth 24 of the sprockets 8 and 23 (FIG. 3) fit into the spaces 20 on opposite sides of the rollers 18 and their connector pins 14 for advancing and guiding the roller chain through the passage of a tunnel oven, as is conventional in the art.

The side plates 13 on one side of the roller chain 9 each may include a mounting flange 15 (FIG. 2) that extends at a right angle from the side plate, horizontally to one side of the direction of travel of the roller chain, and baking pans 26 (FIG. 3A) may be mounted to the mounting flanges 15 for carrying the work products along the chain and through the oven.

FIGS. 2A and 2B illustrate another type of roller chain that may be used for baking ovens. As with the chains illustrated in FIGS. 1A and 1B, the chain links 110 of the roller chain 119 of FIGS. 2A and 2B each include a pair of parallel side plates 112, 113 that have end portions that overlap the side plates of the next adjacent chain links, and connector pins 114 that are mounted through the overlapping ends of the pairs of side plates. Rollers 118 are mounted on the connector pins 114 between the parallel side plates 112 and 113. Spaces 120 are located between and on opposite sides of each roller 118, between the side plates 112 and 113. A pan connector 115 is mounted to the links 112 and 113.

Other types of continuous chains and baking pans may be used with this invention.

FIG. 3A illustrates the chain tensioning device 22 that includes chain tensioning sprocket 23 of a conventional roller chain, with the roller chain 9 or 119 extending through the chain passage of a baker's tunnel oven (not shown). Both sprockets have a plurality of circumferentially spaced teeth 24 that extend radially outwardly from the perimeter of the sprocket and are sized and shaped and positioned to fit into the spaces 20 or 120 of the chain links 10 and 110, on opposite sides of rollers 18, 118. The drive sprocket 8 that may be similar in design to the chain tensioning sprocket 22 moves the continuous chain through the oven and about the chain tensioning sprocket 23 as indicated by the direction arrows 25 and 31 of FIG. 3A.

Figure 3B:
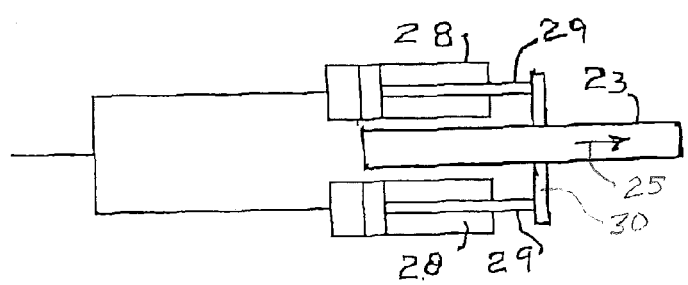
FIG. 3B is a top view of the chain tensioning socket and the cylinders that apply linear force to the chain tensioning socket.

As shown in FIG. 3B, the chain tensioning device 22 may include a pair of fluid activated cylinders 28, each with a piston 29 extending on opposite sides of the chain tensioning sprocket 23. In response to the pressure applied by the cylinders 28 to pistons 29, the pistons 29 urge the chain tensioning sprocket 23 toward the inside of a U-shaped path 31 formed by the roller chain about the tensioning sprocket 23 as the roller chain passes about the tensioning sprocket. This applies linear force 27 to the chain tensioning sprocket that, in turn, pushes the chain tensioning sprocket 23 toward the inside of the U-shaped path 31 of the roller chain and tends to apply tension to the entire length of the roller chain, including the span of the continuous chain that extend entirely through the oven (not shown). The chain tensioning sprocket 23 is free to rotate about its own axis 30 in response to the movement of the roller chain by other driven sprockets 8. The linear movement 27 of the chain tensioning sprocket into the U-shape of the roller chain indicates the expansion of the entire length of the roller chain, and measurement of the linear movement of the chain tensioning sprocket and comparison of the linear movement with linear movements previously taken indicates the amount of expansion of the chain between measurements.

The control system for the fluid actuated cylinders 28 should be capable of applying a constant fluid pressure to the cylinders to apply a constant predetermined force to the chain tensioning sprocket 23. Various fluid circuits may be used.

Figure 4:
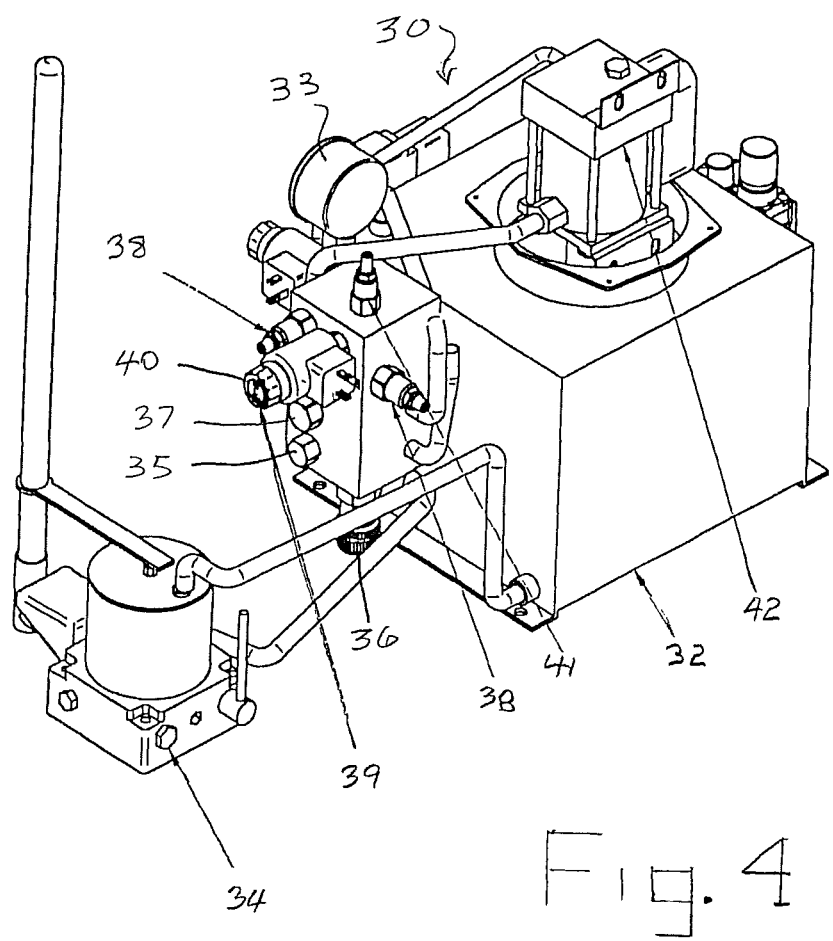
FIG. 4 is a perspective view of the hydraulic unit that includes the air over liquid pump and the hydraulic fluid tank for charging the hydraulic cylinders of FIGS. 3A and 3B.

For example, FIG. 4 shows the control system for the fluid actuated cylinders 28. The control system 30 includes tank 32 for supplying hydraulic fluid that is to be provided under pressure to the cylinders 28 of FIGS. 3A and 3B, cage 33, manual pump 34, check valve 35, needle valve 36, plug 37, and needle valve 38. The two-way direct acting solenoid valve 39 is mounted adjacent the needle valve structure 38. Two-way solenoid valve 40 is mounted to the attachment box that is, in turn, mounted to the tank 32. Haskel pump 42, that is a gas over liquid pump, is mounted atop the tank 32 and communicates with the conduit extending from the valve 43.

Figure 5:
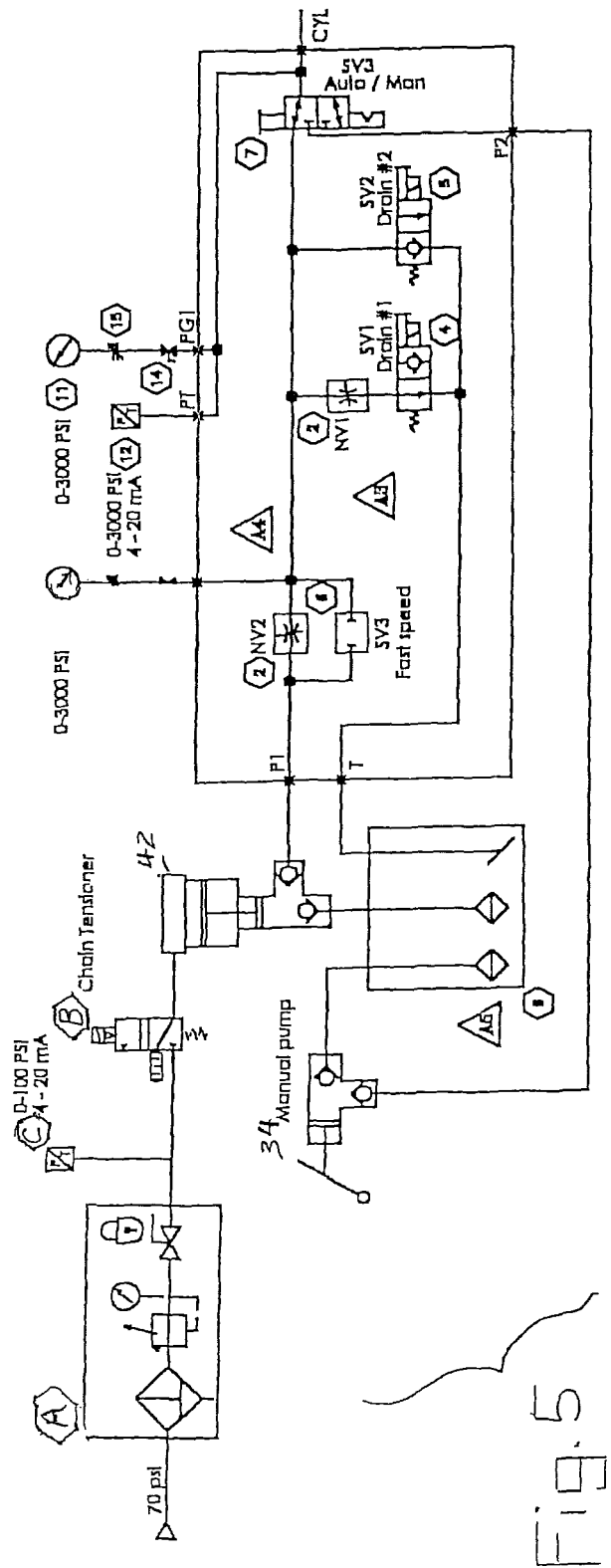
FIG. 5 schematic view of the control circuit that controls the force applied to the chain tensioning sprocket.

As shown in FIG. 5, the electrical/hydraulic circuit communicates with the cylinders/pistons 28 and 29 of the chain tensioning sprocket 23 (FIG. 3). The hydraulic system includes a pneumatic filter A, a poppet valve B, and an effector C. The filter A is a combination of filter, regulator, and shut-off valve. Effector C is a pressure transducer, and two-way poppet valve B supplies air pressure when the pump is to be activated and air pressure is applied to the Haskel pump 42. When the system is to be shut down, the system will go back to zero mechanical energy and the valve B will just vent to the atmosphere so that there is no air pressure on the system.

The Haskel pump 42 communicates with a needle valve 52. When the needle valve 52 opens, the oil will flow down to either position 3, position 4, position 5, or position 7. When pumping up the hydraulic oil, at position 51, the pump has a line that goes down the tank and sucks oil from the tank.

There is a line coming from the pump down to the tank. Another line from the tank extends into the manual pump 10. With regard to the pneumatic pump, there is a call for pressure. On the air side B there is an air valve that will let air flow through to the pump. The pump is a positive displacement device so as the pump sucks up oil and pushes it along, it now has a vacuum so more air will go in and move the cylinders to bring up more oil. Oil will travel out at P1 of the valve body. The oil moves inside the big aluminum valve. The oil moves through a needle valve 2 and the pressure of the oil may be measured by gauges 114, 115 and 111. That prevents high pressure jolts of oil from moving that valve too much and moving the cylinder too much to avoid breaking the pressure gauge by exposing it with hard blasts of pressure.

The arrangement dampens the pressure so that high spikes of oil pressure are avoided. This prevents the gauge from being damaged. Ball valve 119 charges the pressure gauge. When the ball valve is closed, the snubber is removed and the pressure gauge can be relieved if the chain is to be serviced. The oil travels down to another needle valve 2, then goes down to needle valve 4 which is a two-way solenoid. At that point the oil moves out to 5 or the oil is returned to the tank. The oil flow is controlled so that it can go in either direction.

A bleeder valve may be opened to bypass oil back to the tank. A two-way manually operated valve may be positioned in the down position if there is a failure in the pump. If there is a failure of the pump, the operator may move a valve to activate the manual pump.

The pressure that's going out to the cylinders is measured and may be adjusted. With this arrangement the pressure of the gas may be changed.

For example, if the oven is cold and if the desired hydraulic pressure to be communicated to the cylinders 28 is 1000 psi, the pressure in the cylinders is increased until the pressure in the cylinders is 1000 psi and the system is ready for be heated for baking operations with the oven "running." But as the oven heats up, the roller chain will expand due to its thermal expansion. The roller chain will reduce the pressure against the two cylinders because the chain is getting longer due to thermal expansion. But the pressure transducer measures the pressure and it sends a signal back to the PLC that says "run the pump." The pump gets the hydraulic pressure back to 1000 pounds and stops again. This may happen fifteen times in the first hour. It may happen ten times in the second hour and five times in the third hour, depending on conditions such as changing temperature of the roller chain, oven and tensioning sprocket 23, etc.

Once the oven is fully expanded due to the application of heat, the number of corrections of force applied by the chain tensioning sprocket is reduced. It usually takes 2 or 3 hours to stabilize the temperature of the roller chain. Once the temperature of the roller chain is substantially stabilized, there might be another correction signal for changing the force of the cylinders through the course of the day. An object of the process is to maintain a constant pressure against hydraulic cylinders so that the tension applied to the oven chain is constant. That results in tension being applied against the chain at all times during the operation of the oven.

Another advantage of the system is when the system disclosed herein is to be shut down at the end of the day, solenoid valves are opened and bleed the oil back to the tank and reduce the pressure in the hydraulic cylinders down toward zero. This relieves the forces on the chain tensioning sprocket 23 and on the continuous roller chain 9, so that the chain can be more easily inspected and lubricated, etc. Also, as the chain usually is allowed to cool overnight when the oven is not in operation, and the chain does not have to cool under tension.

While the chain management system described above has been described in connection of a baker's tunnel oven, it may be used in connection with intermediate proofers, final proofers, racetrack coolers, spiral coolers, in-ground basket transport systems and possibly in many other types of chain applications. The disclosed chain management system allows plant engineers to predict when the chain needs to be replaced instead of waiting for failure. The system also allows the engineers to predict when the chain should be lubricated.

The chain management system may monitor the expansion of the chain from the first operation of the oven. It can be programmed to measure the roller chain of a baker's oven chain every time the oven is started hot or cold and maintain the measurement in the memory of a PLC. At the end of any period, such as the end of a calendar quarter, there can be an output available from previous chain measurements to inform the plant engineers of how much expansion of the chain has occurred between measurements and how much the chain has worn during that period. And, based on the differences of the measured lengths of expansion of the entire length of the chain, an accurate estimate of remaining chain life may be obtained by comparison with previously established histories of the performances of other similar roller chains.

The chain management systems may use various measuring devices to measure the length of a chain, such as by attaching a laser, IR beam, resistance wire, or ultrasonic measuring device to a fixed position near the chain tensioning sprocket on the frame of the oven. The chain measuring device is focused on the movable chain tensioning sprocket. Each time the oven starts, the position of the chain tensioning sprocket may be recorded and compared to its previous position. This distance may be measured in time increments such as every 5, 30, 60, 300, or 750 seconds and the measurements may be stored in the memory of a PLC. The PLC translates this measurement into inches or millimeters along with the temperature of the chain and displays an output on an operator interface. The PLC can track this measurement until the oven is turned off, and it may continue to track it until the oven has cooled. The operator interface output is in the form of a graph (line, bar, column) and shows the changes in the length of the chain due to temperature and wear. The plant engineer can decide to let the data remain in the PLC or download it into the plant SCADA system.

The chain management system also incorporates a device, such as an inverter, transducer and other metering devices to measure the work of the chain. The PLC will track the work and output of the work in the form of a graph such as a line, bar, or column graph. By tracking the work precise data can be maintained on the load of different products and pans in the oven. In the event of an indication of a high change in work load, the PLC may be programmed to signal an alarm and prevent a catastrophic oven breakdown. Further, in a tray oven the trays may be marked with sequence numbers and the number of the tray that is at the front of the oven will be recorded at the alarm.

The chain management system can be supplied with all new oven tray, grid, plate, mesh belt, intermediate tray proofers, final proofers including rack, tray, and conveyorized stabilized tray, and coolers such as rack, spiral, race track, and continuous coolers, and in-ground basket transport systems. The chain management system also can be retrofitted into existing machines mentioned above.

The chain management system not only can be used for ovens, but may be used for other devices such as, but not limited to, intermediate proofers, final proofers, racetrack coolers, spiral coolers, and in-ground basket transport systems. The chain management system will allow the engineers to predict when the chain needs to be replaced instead of after failure. It will also allow the engineers to predict when the chain should be lubricated.

While this disclosure describes a system of measuring the change of length of a continuous roller chain, the system may be applied to other continuous items that have tension applied thereto, including other types of continuous link chains.

Although a preferred embodiment of the invention has been disclosed in detail herein, it will be obvious to those skilled in the art that variations and modifications of the disclosed embodiment can be made without departing from the spirit and scope of the invention as set forth in the following claims.

The invention claimed is:

1. A process for detecting the deterioration of a continuous conveyor link chain extending in a continuous path due to wear of the links of the chain, comprising:
   heating the chain to a predetermined temperature,
   while the chain is at the predetermined temperature applying a predetermined amount of tension to the chain, and
   while the chain is at its predetermined temperature and tension and extends in its continuous path measuring the change in length of the chain at different time intervals, and
   comparing the measurements of the change in length of the chain at the different time intervals.

2. The process of claim 1, further including moving the chain along its length through the continuous path, and wherein the step of measuring the change in length of the continuous chain comprises measuring the change in length of the chain when the chain is moving along its length through the continuous path.

3. The process of claim 2, wherein the step of moving the chain along a continuous path comprises moving the chain through an oven, and heating the oven, and the step of measuring the change in length of the continuous chain comprises measuring the change in length of the continuous chain at predetermined temperatures of the chain.

4. The process of claim 1, wherein the continuous chain is a roller chain, and the step of applying tension to the continuous roller chain comprises passing the continuous roller chain about a chain tensioning sprocket, and wherein the step of measuring the change in length of the continuous roller chain comprises measuring the linear movement of the chain tensioning sprocket.

5. The process of claim 1, wherein the step of applying tension to the chain comprises applying constant tension at a predetermined force to the chain.

6. The process of claim 1, wherein the step of measuring the change in length of the continuous chain at different time intervals comprises moving the chain about a chain tensioning sprocket, moving the chain tensioning sprocket linearly to apply a constant tension in the chain as the chain moves along its length under constant tension about the chain tensioning sprocket, measuring the linear movement of the chain tensioning sprocket at predetermined times to determine the rate of expansion of the whole chain, and determining the expected operational life of the chain based on the rate of expansion of the whole chain.

7. A process for detecting the deterioration of a continuous conveyor link chain extending through a continuous path due to wear of the links of the chain, comprising:
- moving the chain along its length through the continuous path,
- extending the chain about a rotary chain tensioning device,
- moving the rotary chain tensioning device to apply constant tension in the chain,
- repeatedly measuring the movement of the rotary chain tensioning device at different times when constant tension is applied to the chain by the rotary chain tensioning device and as the chain moves along its length,
- comparing the measurements of the movement of the rotary chain tensioning device, and
- determining the remaining operational life of the chain based on the distance of linear movement of the chain tensioning device at different times.

* * * * *